UNITED STATES PATENT OFFICE.

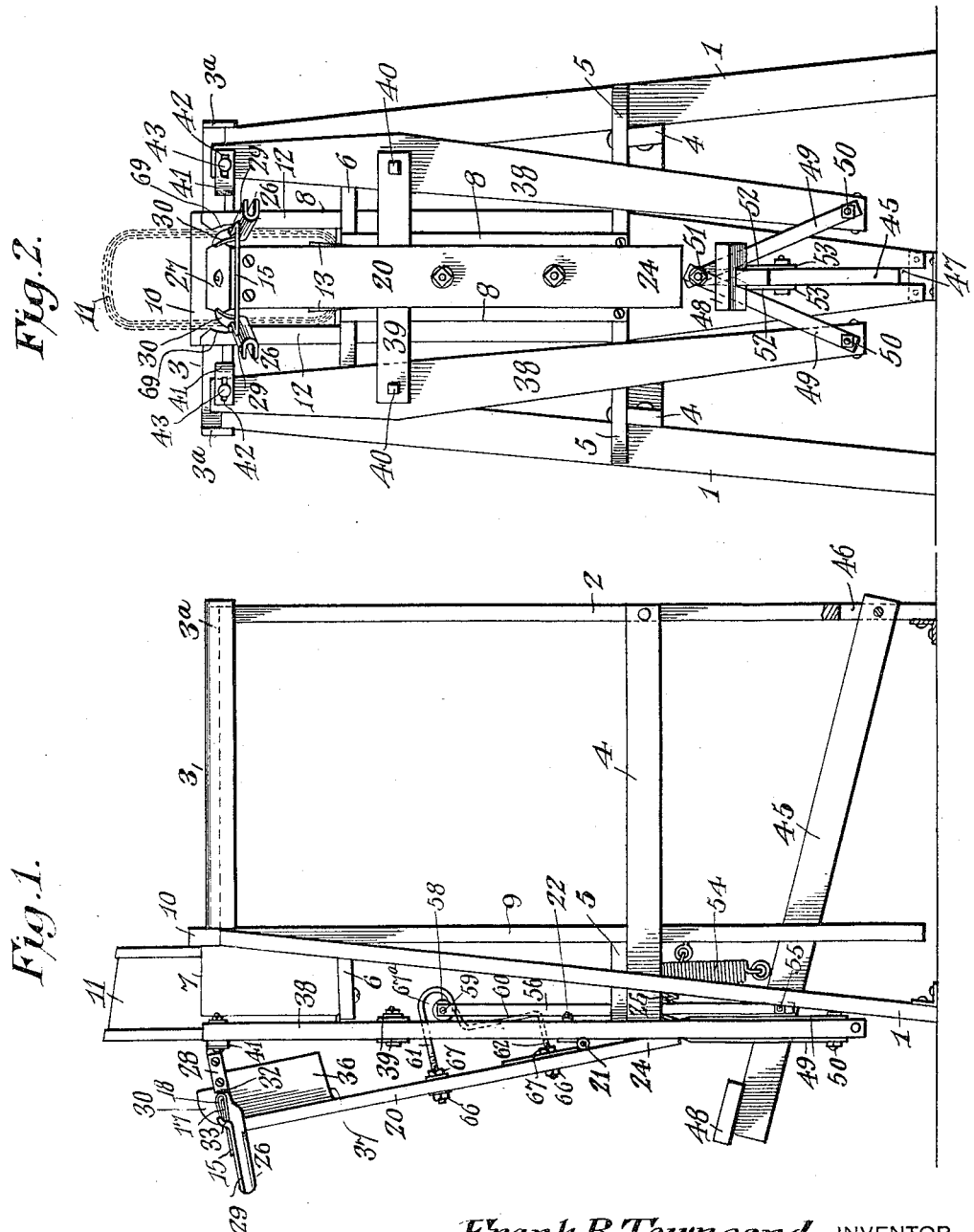
F. B. TOWNSEND.
HANDLE ATTACHING MACHINE FOR BASKETS.
APPLICATION FILED JAN. 18, 1915.
1,151,067.
Patented Aug. 24, 1915.
3 SHEETS—SHEET 1.
Frank B. Townsend, INVENTOR

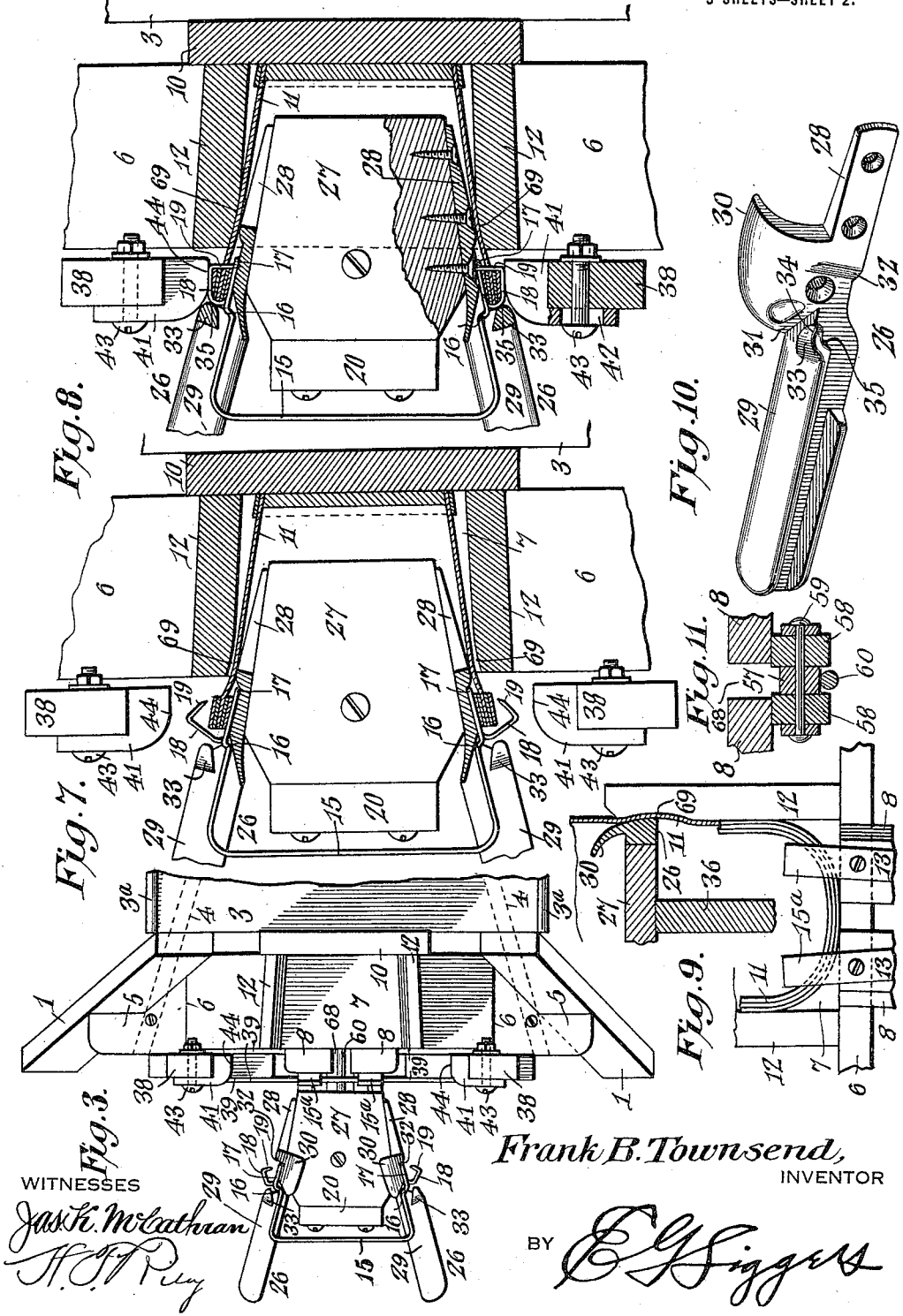

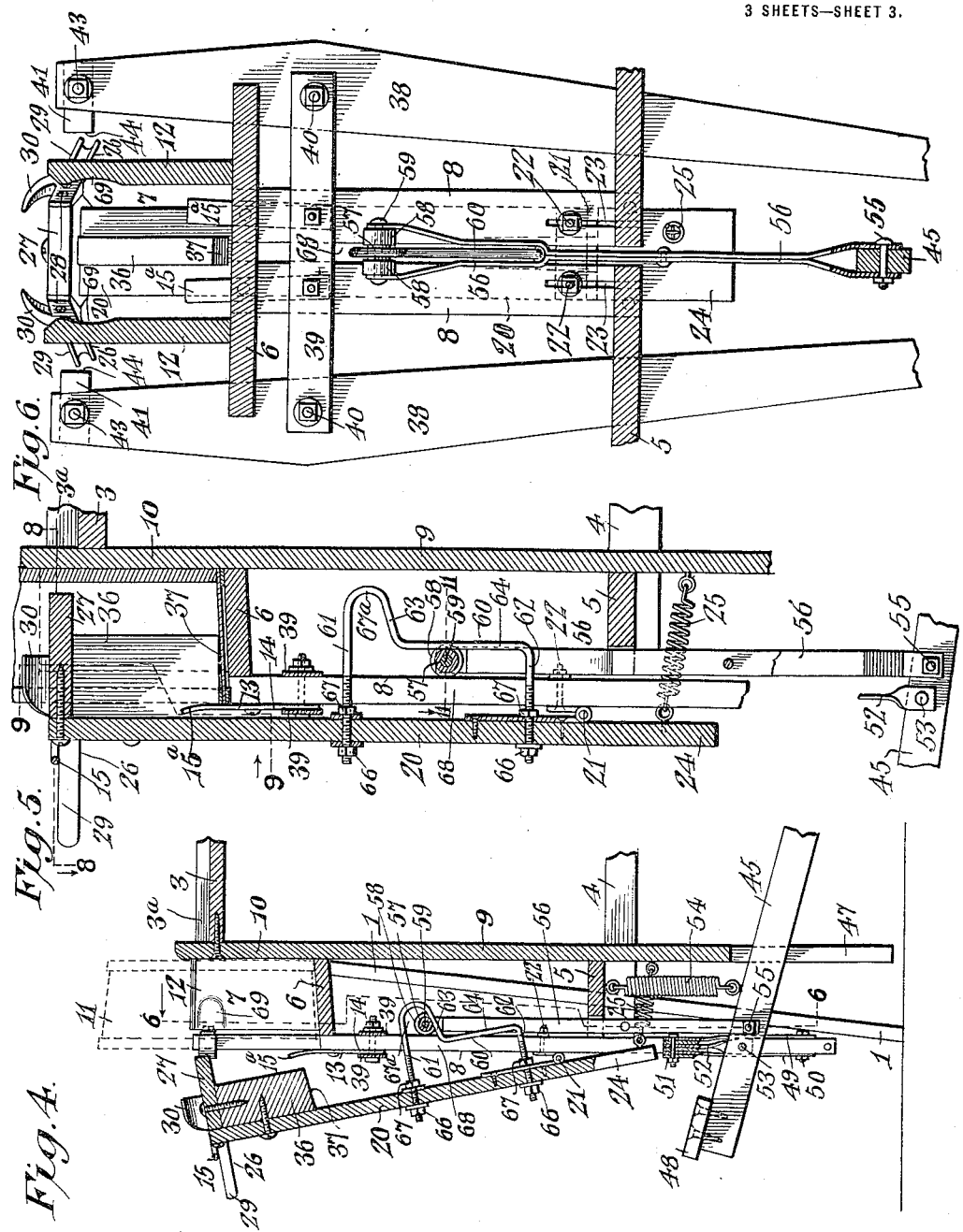

FRANK BOGART TOWNSEND, OF PENN YAN, NEW YORK, ASSIGNOR OF ONE-HALF TO JOHN E. McMATH, OF PENN YAN, NEW YORK.

HANDLE-ATTACHING MACHINE FOR BASKETS.

1,151,067.

Specification of Letters Patent. Patented Aug. 24, 1915.

Application filed January 18, 1915. Serial No. 2,972.

*To all whom it may concern:*

Be it known that I, FRANK B. TOWNSEND, a citizen of the United States, residing at Penn Yan, in the county of Yates and State of New York, have invented a new and useful Handle-Attaching Machine for Baskets, of which the following is a specification.

The invention relates to improvements in handle attaching machines for baskets and analogous receptacles.

The object of the present invention is to improve the construction of handle attaching machines for baskets and analogous receptacles and more especially the machine shown and described in my Patent No. 1,133,201, granted March 23, 1915, and to provide a simple, practical, and comparatively inexpensive machine of this character, of strong and durable construction, designed for applying completed wire handles or bails to baskets and analogous receptacles, and adapted to enable a receptacle and a handle or bail to be easily and quickly placed in proper position in it, and capable, when operated, of automatically carrying a wire handle to the receptacle and of applying pressure at opposite sides of the same to fasten the attaching portions of the handle to the receptacle.

With these and other objects in view the invention consists in the construction and novel combination of parts hereinafter fully described, illustrated in the accompanying drawings, and pointed out in the claims appended hereto, it being understood that various changes in the form, proportion, size and minor details of construction, within the scope of the claims, may be resorted to without departing from the spirit or sacrificing any of the advantages of the invention.

In the drawings:—Figure 1 is a side elevation of a handle attaching machine constructed in accordance with this invention, the basket being shown in position in full lines. Fig. 2 is a front elevation of the same, the basket being illustrated in dotted lines. Fig. 3 is a plan view of the handle attaching machine, the basket being removed. Fig. 4 is a central vertical longitudinal sectional view of the front portion of the machine, the handle carrying lever being in its initial position at the limit of its forward movement. Fig. 5 is an enlarged central vertical sectional view of the front portion of the handle attaching machine, parts being omitted. Fig. 6 is a transverse sectional view on the line 6—6 of Fig. 4. Fig. 7 is an enlarged horizontal sectional view, illustrating the arrangement of the parts preparatory to the operation of the laterally movable pressure applying levers. Fig. 8 is a similar view, taken substantially on the line 8—8 of Fig. 5, illustrating the arrangement of the parts after the pressure has been applied by the laterally movable levers. Fig. 9 is a detail transverse sectional view taken substantially on the line 9—9 of Fig. 5. Fig. 10 is a detail perspective view of one of the handle supporting members. Fig. 11 is a horizontal sectional view on the line 11—11 of Fig. 5.

Like numerals of reference designate corresponding parts in all the figures of the drawings.

In the accompanying drawings, in which is illustrated the preferred embodiment of the invention, the frame of the machine, which may be of any preferred construction, is provided at the front with a pair of horizontally inclined legs 1, and at the back with a centrally arranged vertically disposed leg 2, the legs being connected at their upper ends by an approximately rectangular table or top 3 and lower rearwardly converging side bars 4. The table, which is constructed substantially as that shown in the said patent, is provided at its side and rear edges with an uwardly extending flange 3ª, and the front legs are connected by a front transverse bar or member 5, arranged upon and secured to the front portions of the side bars, the front ends of the side bars 4 being extended laterally in advance of the inclined front legs 1 and the terminals of the transverse bar 5 being recessed to receive the said legs 1. The frame is also provided at the front with an upper transversely disposed shelf 6, extending across the space between the upper portions of the front legs 1 and constituting the bottom of a basket box or holder 7. The transverse shelf or member 6, which is arranged at a slight inclination to correspond with the taper of a grape basket or analogous receptacle, is supported at its front edge by a pair of central vertical bars or members 8, and it is secured at its rear edge to an intermediate vertical bar or member 9, located in rear of the front supporting bars or members 8 and constituting the back or rear wall 10 of the basket receiving box or holder 7. The intermediate vertical bar or member is suitably secured to the top or table 3 and to the lower transverse bar 5. The front centrally arranged bars or members 8 are suitably secured to the front edges of the upper inclined shelf or member 6 and the lower transverse bar or member 5.

The box or holder, which is adapted to receive an ordinary grape basket 11, consists of the bottom 6, the rear wall 10, and forwardly diverging side walls 12 mounted upon the transverse shelf and conforming to the taper of the sides of the grape basket. The lower edges of the sides are inclined to correspond with the inclination of the shelf or member 6, and the said sides are rigidly secured to the shelf and to the rear wall 10. The box or holder, which is open at the top to enable a basket to be readily placed in it, may, in practice, be constructed of any desired size to fit the receptacles to which the handles are to be applied. The basket 11 is arranged within the box, the latter resting upon one end with its open top to the front. The basket is retained in the box or holder by a pair of front upwardly projecting arms 13, preferably constructed of resilient material and having lower attaching portions 14 which are secured to the upper portions of the central vertical bars 8 at the front faces thereof. The arms 13, which project above the bottom of the box or holder 7, are spaced apart and their upper portions 15ª are slightly inclined and extend upwardly and forwardly to enable a basket to be easily and quickly placed within the box or holder without catching upon the upper ends of the projecting arms. The arms 13 fit against the baskets at opposite sides of the lower end thereof, and retain the said basket in position to receive a wire handle 15, and they do not interfere with the rapid removal of the basket from the box or holder after the handle has been attached to the basket.

The machine of the present application, like that of the aforesaid patent, is designed principally for applying to baskets the wire handle forming the subject matter of an application filed by me on the 3rd day of March, 1914, Serial No. 828,641. At the same time, it is capable of applying similar handles to baskets and other receptacles, and may be modified to conform to the configuration of the receptacles and the handles to be applied to the same. The handle 15, which is constructed of a single piece of wire, is approximately U-shaped, being composed of a transverse grip portion and converging sides provided at their lower or outer ends with lateral bends 16 having integral clamps including loops 17 and coacting sides or jaws 18. The loops 17 are connected at one side thereof with the lateral bends 16, and the sides or jaws 17, which are connected with the other side of the loops, are provided with transversely disposed inwardly extending terminal prongs 19, which pierce the sides of the basket. The clamps of the wire handle are open and have their sides or jaws arranged at an acute angle to the loops, as illustrated in Figs. 3 and 7, prior to applying pressure to the clamps for engaging the same with the sides of the basket.

The wire handle 15 is placed upon a handle support and is carried to the basket to a position for engaging the sides of the same by an oscillatory lever 20, mounted at the front of the machine and normally disposed at an inclination, with its upper end arranged in spaced relation with the basket receiving box or holder. The lever 20, when arranged at an inclination, extends upwardly and forwardly from the lower ends of the vertical bars or members 8, being connected with the latter by a hinge 21 or other suitable means for fulcruming the lever. The hinge 21, which forms a convenient means for mounting the lever, has one of its leaves secured to the inner or rear face of the lever 20, and its other leaf is fastened to the front face of the lower end of the vertical bars or members 8 by bolts 22, operating in vertical slots 23 adapted to permit the lever 20 to be adjusted upwardly and downwardly to arrange the handle support in proper position with relation to the basket receiving box or holder. The side hinge 21 is spaced from the lower end of the lever 20 to form a short lower arm 24, and a coiled spring 25, which is secured at one end to the intermediate vertical bar 9, is connected at its other end to the lower arm 24 of the lever 20 for urging the upper arm of the same forwardly or outwardly.

The handle support comprises a pair of handle receiving and supporting members 26, constructed of suitable metal and arranged at opposite sides of and carried by a head or plunger 27, secured to the lever 20 at the upper end thereof and extending rearwardly therefrom and adapted to project into the basket 11, similar to the head or plunger of the machine of the aforesaid patent. The handle receiving members 26 consist of an inner rearwardly tapered or wedge-shaped portion 28, front outwardly extending arms or portions 29, and upwardly projecting wings 30, extending from the intermediate portions of the handle supporting members. The inner and intermediate portions of the said members 26 are secured by screws or other suitable fastening devices to the side edges of the head or plunger, which is tapered inwardly or rearwardly, as clearly illustrated in Figs. 7 and 8. The intermediate portions of the handle receiving members are provided with shoulders 31 and 32, adapted to be engaged by the lateral bends 16 and the ends of the loops 17 of the handle. The sides of the handle rest upon the outwardly diverging arms 29 and also yieldably embrace the intermediate portions of the members 26 of the handle support. The shoulders 31, which are formed by the front portions of the wings 30, extend upwardly from the inner ends of the arms 29 and provide recesses corresponding with the recesses of the head or plunger of the machine of the said application, and the shoulders 32, which are located at the enlarged ends of the front tapered or wedge-shaped portions 28, form guards which prevent the loops from coming in contact with and being displaced by the sides of the basket when the head or plunger moves into the same in carrying the handle thereto. The upwardly extending wings, which are curved, are disposed at an inclination and present rounded inclined exterior faces adapted to guide the sides of the handle into proper position on the members of the handle support. This enables the operator to place a handle quickly and accurately in position with the ends of the loops contiguous to the shoulders 32, and the lateral bends against the shoulders 31. The tapering head or plunger and the tapered portions of the handle supporting members 26 enable the said parts to readily pass between the sides of a basket in the inward or rearward movement of the upper arm of the lever 20, and the side members are provided at the inner ends of the arms 29 with upwardly projecting lugs or abutments 33 arranged in spaced relation with the shoulders 31 and having overhanging rearwardly projecting upper terminals 34 and angularly disposed inner or rear engaging faces 35 located below the top terminal portions 34 and adapted to engage with the lateral bends in the final operation of the machine when the lateral pressure is applied to the clamps to force the same into engagement with the sides of the basket, as hereinafter fully explained. The lugs 33 effectually prevent the clamps from becoming displaced when subjected to lateral pressure in securing the handle to the sides of the basket. The resiliency of the wire handles enables them to yieldably embrace the members 26 and maintain themselves in engagement with the same until they are engaged with the sides of the basket. The arms support the sides of the handle beyond the lateral bends, and there is no liability of the sides of the handle accidentally tipping or tilting and becoming displaced through gravity. When the head or plunger is moved rearwardly into the basket, the latter is engaged at the bottom by a clamping member 36, which engages the inner face of the lower end of the basket and firmly holds the latter in the box while the handle is being applied. The clamping member preferably consists of a block or piece secured to the rear face of the lever 20 at the upper portion thereof and extending downwardly from the lower face of the head or plunger and adapted to brace and support the latter. The clamping block or member is arranged centrally of the upper portion of the lever 20, as clearly illustrated in Fig. 6, and its lower edge 37 is inclined to conform generally to the inclination of the lower end of the basket. The sides or jaws 18 of the clamps of the wire handle are bent inwardly against the outer faces of the sides of the basket by a pair of levers 38, arranged in substantially an upright position and pivoted between spaced arms 39 by bolts 40 or other suitable fastening devices. The arms 39, which support the levers 38, preferably consist of bars secured to the front and rear faces of the vertical bars or members 8 and projecting laterally therefrom. The levers 38, which are fulcrumed intermediate of their ends, have short upwardly extending arms which are provided at their inner edges with approximately L-shaped jaws 41, constituting outer dies or hammers and consisting of heads located at the inner edges of the upper arms of the levers 38 and attaching shanks arranged at the front faces of the said levers 38 and provided with slots 42 for the reception of bolts 43 or other suitable fastening means for securing the jaws or outer dies to the levers. The slots, which are disposed transversely of the levers, enable the jaws to be adjusted to enable the desired pressure to be employed for forcing the clamps into engagement with the sides of the basket. The jaws are preferably provided with flat faces 44 for engaging the outer sides of the clamps of the wire handle, as the rearwardly projecting lugs 33 will assist in holding the clamps of the wire handle in position while the same are being engaged with the sides of the basket. The wire handle is carried into the basket in the position illustrated in Fig. 7, and the clamps are caused to straddle the sides of the basket. When the outer jaws or dies move inwardly to secure the wire handle to the basket, the head or plunger is forced inwardly to the position illustrated in Fig. 8 to carry the lugs 33 into engagement with the adjacent ends of the clamps to effectually prevent the same from slipping forwardly on the sides of the basket. This will cause the clamps to properly engage the sides of the basket.

The upper arms of the levers 38 swing transversely of the machine and their relatively long arms are forced outwardly by means of a treadle 45, extending longitudinally of the machine at the bottom of the frame and fulcrumed at its rear end in a slot 46 of the rear leg of the frame. The treadle extends through and is guided in a slot or bifurcation 47 in the lower portion of the intermediate vertical bar or member 9, and its front or outer portion extends between the lower arms of the levers 38 and is provided with a foot plate 48 adapted to be depressed by the foot of the operator. The front portion of the treadle 45 is connected with the lower ends of the levers 38 by toggle links 49 arranged at an inclination and converging upwardly as clearly shown in Fig. 2, when the said levers 38 are in their normal position. The links 49, which are arranged in pairs, are pivoted at their lower ends 50 to the lower terminals of the levers 38, and their upper terminals 51 are pivotally connected with each other and to the upper ends of their vertical links 52, which are pivoted at their lower ends 53 to the front portion of the treadle at opposite sides thereof. When the treadle is depressed, the lower arms of the levers 38 are spread or forced outwardly, and the upper arms 40 are moved inwardly into engagement with the terminal clamps of the wire handle. When the treadle is released, the levers 38 are returned to their initial position by a vertically disposed coiled spring 54, secured at one end to the lower transverse bar or member 5 and connected at its other end to the treadle 45. The parts are preferably so proportioned that the floor or other supporting surface will limit the downward movement of the treadle prior to the toggle links 49 assuming a horizontal position, so that the said links 49 will not operate as a lock and hold the lower arms of the levers 38 in a spread condition. The treadle is also connected by a bolt 55 with the lower end of a vertically disposed reciprocatory link or member 56 extending upwardly from the treadle and composed of two sides or pieces spaced apart at their lower ends to straddle the treadle and at their upper ends to receive central and side rollers 57 and 58, which are mounted on a transverse pivot 59. The central roller, which is of less diameter than the side rollers, is adapted to engage a guide 60, preferably constructed of rod metal, and consisting of spaced upper and lower arms 61 and 62, and upper and lower portions 63 and 64. The arms 61 and 62, which extend rearwardly from the lever 20, have threaded terminal portions 65, piercing the lever 20 and adjustably secured to the same by front and rear nuts 66 and 67. The threaded terminals of the arms 61 and 62 of the guide enable the latter to be adjusted with respect to the head or plunger to enable the handle to be placed in position against the sides of the basket with the desired pressure. This adjusting means also varies the pressure with which the clamping block or member 36 engages the lower end of the basket. The upper portion 63, which is connected at its rear end with the upper arm by a curved bend or portion 67ª, is arranged at an inclination, and the lower portion 64, which extends from the upper inclined portion to the lower arm, is disposed in substantial parallelism with the lever 20 and is arranged in a vertical position when the latter is vertical, as illustrated in Fig. 5. The guide 60 extends rearwardly between the central vertical bars or members 8, which are spaced apart to provide an opening 68, and the rollers are located at the inner or rear faces of the bars or members 8. The side bars 8 constitute a fixed vertical guide for the side rollers, which are adapted to roll on the said bars 8 in the upward and downward movements of the treadle. When the treadle is elevated, as illustrated in Fig. 4, the rollers are located near the rear end of the upper inclined portion 63 of the guide; and when the treadle is depressed, the roller is moved downwardly, the central roller engaging the inclined portion of the guide and forcing the same and the lever 20 rearwardly. The inclined portion of the guide is of sufficient length to produce the desired oscillatory movement of the lever 20, and the central roller 57, after swinging the lever 20 rearwardly, slides downwardly on the lower portion 64 of the guide and locks the lever in such position until the treadle is released. By constructing the central and side rollers of different diameters, they are adapted to ride on the central vertical bars and the guide, and rotate in opposite directions during the movement of the rollers along the lower portion 64 of the guide. The particular construction of the guide causes the lever 20 to oscillate and place the wire handle in position with relation to the basket prior to the jaws or outer dies of the levers 38 engaging the attaching portions of the said handle, and during the upward movement of the treadle, the jaws or dies of the said levers 38 are moved out of engagement with the attaching portions of the wire handle prior to the outward or forward movement of the lever 20, which lifts the basket out of the box or holder. In the operation of the machine the sides of the basket are expanded by the tapered or wedge-shaped portions of the handle support into recesses 69, formed in the inner faces of the sides of the basket holder or box 7, but any other desired form of box or holder may, of course, be employed.

What is claimed is:—

1. A handle attaching machine comprising receptacle holding means, a handle support provided with means for receiving a completed wire handle and being of a size to extend into the receptacle to form an inner die, said handle support being also provided at opposite sides with abutments movable into engagement with the attaching portions of a handle to retain the same in proper position with relation to the receptacle when the handle support projects into the same, and means operating exteriorly of the receptacle and coacting with the said inner die for forcing the handle into engagement with the receptacle.

2. A handle attaching machine comprising receptacle holding means, a handle support including a head and handle receiving members located at opposite sides of the head and arranged to support a completed wire handle, and provided with inner tapered or wedge-shaped portions forming guard shoulders for the wire handle, and means operating exteriorly of the receptacle and coacting with the handle support for forcing the handle into engagement with the receptacle.

3. A handle attaching machine comprising receptacle holding means, a handle support including a head or plunger and handle receiving members located at opposite sides of the head or plunger and provided with projecting wings arranged to guide a wire handle on the said members, and means operating exteriorly of the receptacle and coöperating with the handle support for forcing the handle into engagement with the receptacle.

4. A handle attaching machine comprising receptacle holding means, a handle support including a head or plunger, and handle receiving members located at opposite sides of the head or plunger and provided with portions arranged to be yieldably embraced by a resilient wire handle, said members being also provided with forwardly projecting arms arranged to support the sides of the handle, and means coöperating with the handle support for forcing the handle into engagement with the receptacle.

5. A handle attaching machine comprising receptacle holding means, a handle support including a head or plunger and handle receiving members located at opposite sides of the head or plunger, and consisting of inner approximately wedge-shaped portions, intermediate portions arranged to be embraced by the handle, and outer forwardly projecting arms adapted to support the sides of the handle, and means coöperating with the handle support for forcing the handle into engagement with the receptacle.

6. A handle attaching machine comprising receptacle holding means, a handle support including a head or plunger and handle receiving members located at opposite sides of the head or plunger and consisting of inner wedge-shaped portions forming guard shoulders, intermediate portions provided with shoulders and arranged to be embraced by the handle, and forwardly projecting arms adapted to support the sides of the handle, and means coöperating with the handle support for forcing the handle into engagement with the receptacle.

7. A handle attaching machine comprising receptacle holding means, a handle support including a head or plunger and handle receiving members located at opposite sides of the head or plunger and consisting of inner tapered portions, intermediate portions adapted to be embraced by the handle and provided with upwardly projecting wings arranged to guide the handle onto the said members, and outwardly projecting arms adapted to support the sides of the handle, and means coöperating with the handle support for forcing the handle into engagement with the receptacle.

8. A handle attaching machine comprising receptacle holding means, a handle support including a head or plunger and handle receiving members located at opposite sides of the head or plunger and provided with portions arranged to be embraced by a wire handle and having upwardly extending curved wings set at an inclination and presenting rounded exterior faces for guiding the handle onto the said members, the latter being also provided with means for supporting the sides of the handle, and means coöperating with the handle support for forcing the handle into engagement with the receptacle.

9. A handle attaching machine comprising receptacle holding means, a handle support including a head or plunger and handle receiving members located at opposite sides of the head or plunger and provided with portions arranged to be embraced by a wire handle, said members being also provided with projecting abutments arranged to be moved into engagement with the handle after the latter has been carried to the receptacle, and means coöperating with the handle support for forcing the handle into engagement with the receptacle.

10. A handle attaching machine comprising receptacle holding means, a handle support including a head or plunger and handle receiving members located at opposite sides of the head or plunger and provided with intermediate portions arranged to be embraced by the sides of a wire handle, said members being also provided with projecting lugs spaced from the said portions and adapted to be moved into engagement with the handle, said lugs having terminals arranged to extend over the engaged portions of the handle, and means coöperating with the handle support for forcing the handle into engagement with the receptacle.

11. A handle attaching machine comprising receptacle holding means, a handle supporting including a head or plunger and handle receiving members located at opposite sides of the head or plunger and consisting of tapered inner portions, intermediate portions arranged to be embraced by a wire handle and having projecting wings arranged to guide a handle onto the members, and forwardly extending arms provided at their inner portions with projecting lugs or abutments spaced from the intermediate portions of the members and arranged to be moved into engagement with the handle after the same has been carried to the receptacle, and means coöperating with the handle support for forcing the handle into engagement with the receptacle.

12. A handle attaching machine including receptacle holding means, an oscillatory lever provided with means for supporting a wire handle and movable to and from the receptacle holding means, a reciprocatory member, means connected with the lever and arranged to be actuated by the reciprocatory member for swinging the lever in one direction, and means for automatically swinging the lever in the opposite direction.

13. A handle attaching machine including receptacle holding means, an oscillatory lever provided with means for supporting a wire handle and movable to and from the receptacle holding means, a reciprocatory member, and means connected with the lever and arranged to be engaged and actuated by the said reciprocatory member for swinging the lever to the receptacle holding means.

14. A handle attaching machine including receptacle holding means, an oscillatory lever provided with means for supporting a wire handle and movable to and from the receptacle holding means, a reciprocatory member, means connected with the lever and arranged to be engaged and actuated by the said reciprocatory member for swinging the lever and the receptacle holding means, and a spring connected with the lever for moving the same away from the receptacle holding means.

15. A handle attaching machine including receptacle holding means, an oscillatory lever provided with means for supporting a wire handle and movable to and from the receptacle holding means, a reciprocatory member, means connected with the lever and arranged to be actuated by the reciprocatory member for swinging the lever in one direction, means for automatically swinging the lever in the opposite direction, and a treadle connected with the reciprocatory member.

16. A handle attaching machine including receptacle holding means, an oscillatory lever provided with means for holding a wire handle and movable to and from the receptacle holding means, a reciprocatory member, and a guide connected with the lever and having an angularly disposed portion arranged to be engaged by the reciprocatory member for swinging the lever.

17. A handle attaching machine including a receptacle holding means, an oscillatory lever provided with means for holding a wire handle and movable to and from the receptacle holding means, a reciprocatory member, and a guide connected with the lever and having an angularly disposed portion arranged to be engaged by the reciprocatory member for swinging the lever to the receptacle holding means, said guide being also provided with a portion arranged to be engaged by the reciprocatory member for retaining the lever at the receptacle holding means.

18. A handle attaching machine including receptacle holding means, an oscillatory lever provided with means for holding the wire handle and movable to and from the receptacle holding means, a vertically reciprocatory member, and a guide carried by the lever and having an upper inclined portion arranged to be engaged by the said member for swinging the lever to the receptacle holding means, said guide being also provided with a lower portion in substantial parallelism with the lever and adapted to be engaged by the reciprocatory member for retaining the lever at the receptacle holding means during a portion of the movement of the said member.

19. A handle attaching machine including receptacle holding means, an oscillatory lever provided with means for holding the wire handle and movable to and from the receptacle holding means, a vertically reciprocating member, a guide carried by the lever and having an inclined or angularly related portion arranged to be engaged by the reciprocatory member for swinging the lever to the receptacle holding means, said guide being also provided with a portion arranged to be engaged by the said member to retain the lever at the receptacle holding means during a portion of the movement of the said member, and means for adjusting the guide for varying the pressure of the lever against the receptacle.

20. A handle attaching machine including receptacle holding means, an oscillatory handle carrying lever, a guide consisting of upper and lower arms mounted on and extending from the lever, an upper inclined portion connected with the upper arm, and a lower portion extending from the inclined portion to the lower arm and arranged in substantial parallelism with the lever, and a reciprocatory member having a roller operating in the guide and arranged to engage the upper inclined portion and the said lower portion of the guide to oscillate the lever and also to hold the same in a stationary position during a portion of the movement of the said member.

21. A handle attaching machine including a frame having a fixed vertical guide, receptacle holding means mounted on the frame, an oscillatory lever provided with means for holding a wire handle and movable to and from the receptacle holding means, a guide mounted on the lever, and a reciprocatory member arranged to engage the guide of the lever for actuating the latter and provided with a roller arranged to run on the fixed vertical guide of the frame.

22. A handle attaching machine including a frame having fixed guiding means, receptacle holding means mounted on the frame, an oscillatory lever provided with means for holding a wire handle and movable to and from the receptacle holding means, a guide carried by the lever, and a reciprocatory member provided with rollers of different diameters and arranged to coact with the fixed guiding means of the frame and the guide of the lever and rotatable in opposite directions.

23. A handle attaching machine including a frame provided with an opening and having fixed guiding means at opposite sides thereof, an oscillatory handle-carrying lever provided with a guide extending through the said opening, and a reciprocatory member provided with side rollers arranged to run on the fixed guiding means of the frame, said member being also provided with a central roller of less diameter than the side rollers, said central roller operating within the guide and arranged to engage the same to actuate the lever.

24. A handle attaching machine including a frame having a receptacle holding means, handle-carrying means movable to and from the receptacle holding means, pressure-applying levers operating at opposite sides of the receptacle holding means, and substantially L-shaped jaws consisting of attaching portions adjustably secured to the levers, and heads adapted to be adjusted with respect to the receptacle holding means for varying the pressure.

25. A handle attaching machine including a receptacle holder open at the top and front and provided at the bottom with upwardly projecting means arranged to engage a receptacle for retaining the same in the box or holder, handle-carrying means movable to and from the receptacle box or holder, and pressure-applying means located at opposite sides of the box or holder for forcing the terminals of the handle into engagement with the receptacle.

26. A handle attaching machine including a receptacle holder open at the top and front and provided at the bottom with spaced upwardly projecting arms arranged to engage a receptacle for retaining the latter in the box or holder, handle-carrying means movable to and from the receptacle box or holder, and pressure-applying means located at opposite sides of the box or holder for forcing the terminals of the handle into engagement with the receptacle.

In testimony, that I claim the foregoing as my own, I have hereto affixed my signature in the presence of two witnesses.

FRANK BOGART TOWNSEND.

Witnesses:
J. FRANK DOUGLASS,
CHARLES N. NUGENT.

Copies of this patent may be obtained for five cents each, by addressing the "Commissioner of Patents, Washington, D. C."